United States Patent
Azimi et al.

(10) Patent No.: US 10,927,825 B1
(45) Date of Patent: Feb. 23, 2021

(54) VACUUM ARC THRUSTERS FOR SPACECRAFT, AND PROPULSION SYSTEMS INCLUDING THE SAME

(71) Applicant: United States of America as represented by the Administrator of NASA, Washington, DC (US)

(72) Inventors: Behnam Azimi, Greenbelt, MD (US); Steven M. West, Greenbelt, MD (US); Dakotah B. Rusley, Greenbelt, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 161 days.

(21) Appl. No.: 16/135,747

(22) Filed: Sep. 19, 2018

(51) Int. Cl.
*F03H 1/00* (2006.01)
*H05H 1/50* (2006.01)
*B64G 1/40* (2006.01)

(52) U.S. Cl.
CPC .......... *F03H 1/0087* (2013.01); *B64G 1/405* (2013.01); *F03H 1/0018* (2013.01); *H05H 1/50* (2013.01)

(58) Field of Classification Search
CPC . F03H 1/00–0093; B64G 1/405; B64G 1/406; H01J 37/32055
See application file for complete search history.

(56) References Cited

U.S. PATENT DOCUMENTS

| | | | | |
|---|---|---|---|---|
| 6,465,793 | B1 * | 10/2002 | Anders | H05H 1/24 250/426 |
| 7,530,219 | B1 * | 5/2009 | Burton | F03H 1/0087 60/202 |
| 2007/0045248 | A1 * | 3/2007 | Schein | F03H 1/0087 219/121.52 |
| 2011/0258981 | A1 * | 10/2011 | Keidar | B64G 1/405 60/202 |
| 2016/0273424 | A1 * | 9/2016 | Han | F01N 1/165 |
| 2016/0273524 | A1 | 9/2016 | Keidar et al. | |

OTHER PUBLICATIONS

Melone "In Situ Characterisation of Permanent Magnetic Quadrupoles for Focussing Proton Beams" (Year: 2011).*

* cited by examiner

*Primary Examiner* — Gerald L Sung
*Assistant Examiner* — William L Breazeal
(74) *Attorney, Agent, or Firm* — Matthew F. Johnston; Bryan A. Geurts; Helen M. Galus

(57) ABSTRACT

A vacuum arc thruster (VAT) for a propulsion system of a micro-satellite is provided. The VAT includes an anode, a cathode including a fuel, and an insulator between the anode and the cathode. The VAT is operable to create an arc between the anode and the cathode and discharge plasma through the diverging nozzle as thrust. The anode may define a diverging nozzle. The VAT may further include a Halbach array including a plurality of permanent magnets arranged in a ring, each of the permanent magnets of the ring having a radially inward positioned north pole and a radially outward positioned south pole.

8 Claims, 8 Drawing Sheets

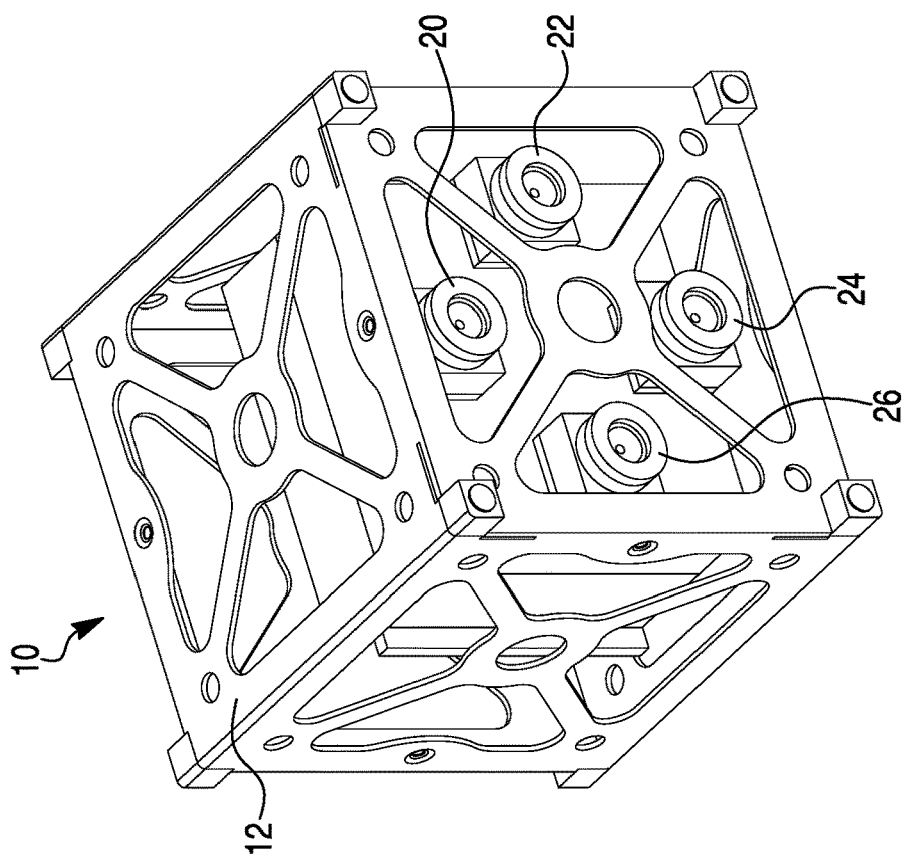
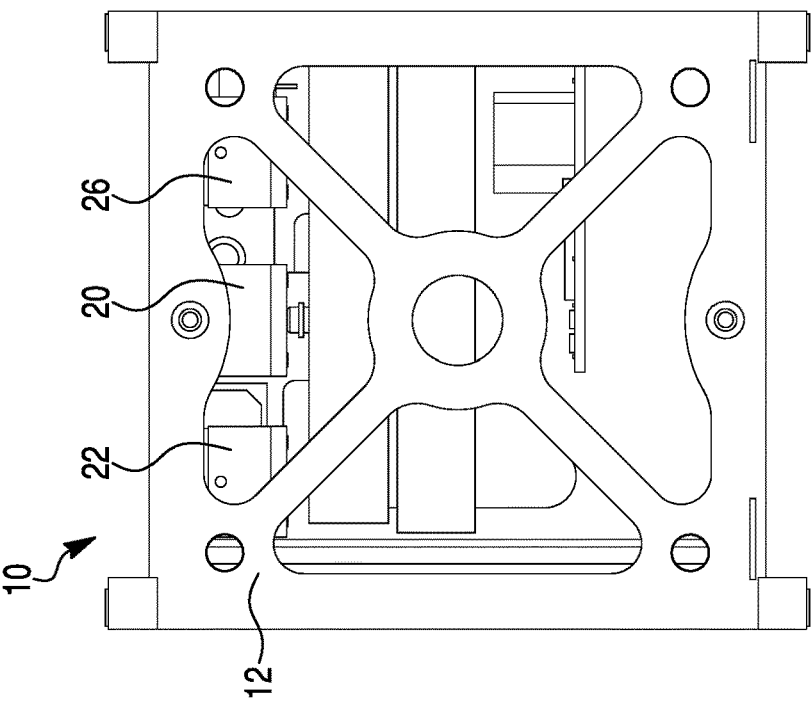

VACUUM ARC THRUSTERS FOR SPACECRAFT, AND PROPULSION SYSTEMS INCLUDING THE SAME

STATEMENT REGARDING FEDERALLY SPONSORED RESEARCH OR DEVELOPMENT

The invention described herein was made in part by employees of the United States Government and may be manufactured and used by or for the Government of the United States of America for governmental purposes without the payment of any royalties thereon or therefor.

FIELD OF THE INVENTION

The present invention relates to vacuum arc thrusters for spacecraft (e.g., cube satellites and small satellites), to propulsions systems including the same, and to related methods.

BACKGROUND

Small spacecraft, such as cube satellites (or CubeSats, for short) and small satellites (or SmallSats, for short), have demonstrated exceptional potential for low-cost science platforms in space. Small spacecraft such as CubeSats and SmallSats use miniaturized thrusters for providing thrust to properly position the spacecraft.

The ideal CubeSat or SmallSat thruster is one that balances reliability, high performance (e.g., high specific impulse (Isp) and precision thrust), scalability, reduced contamination, low pressure operation (or pressurizes post-deployment), safe propellant containment (hazardous or nonhazardous), low cost, and simplicity in design.

There are currently a wide range of technologies for miniaturized thrusters. One such system uses plasma-based vacuum arc thrusters (VATs) that produce thrust by emitting ions in a plasma jet. Typically, VATs include two metallic electrodes separated by a dielectric insulator, a voltage source, and an inductor. The current in the inductor increases until a switch is opened, which causes an electric arc to develop between the electrodes. The electric arc forms a cathode spot (or localized region of high temperature at the interface of the cathode and the insulator), which ablates the cathode electrode as ions of a high velocity plasma.

The currently used Micro-Cathode Arc Thruster (pCAT) design includes a 5 mm thruster head that contains concentrically aligned and tubular shaped anode, cathode and insulator. By sending a pulse created by a power processing unit (PPU) to the interface of the cathode and the insulator, a high voltage arc is produced between the cathode and anode. This pCAT technology generates thrust by consuming the cathode material made of titanium with a high voltage vacuum arc, producing highly ionized plasma jets with high exhaust velocities.

The operation of the current pCAT has been problematic in practice and fraught with issues. The thrusters exhibit uneven erosion over the cathode face, which can adversely affect the thruster characteristics and plasma plume direction during operation. Additionally, uneven cathode erosion creates macroparticles (non-ionized cathode material) that travel at slower velocities than ions (thereby not significantly contributing to thrust), adversely affect the specific impulse, and implant into the electrodes and electronics. Annular magnets attached around the thrust channel for producing magnetic fields have not effectively channeled the plasma jet into a collimated plume. Lack of collimation decreases the thrust and also can cause contamination issues such as resetting electronics components or coating the satellite.

SUMMARY OF THE INVENTION

A first aspect of the invention provides a vacuum arc thruster (VAT) for a propulsion system of a micro-satellite. The VAT includes an anode defining a diverging nozzle, a cathode comprising a fuel, and an insulator between the anode and the cathode. The VAT is operable to create an arc between the anode and the cathode and discharge plasma through the diverging nozzle as thrust.

According to a second aspect of the invention, a vacuum arc thruster (VAT) for a propulsion system of a micro-satellite is provided. The VAT includes an anode, a cathode comprising a fuel, an insulator between the anode and the cathode, and a Halbach array. The Halbach array includes a plurality of permanent magnets arranged in a ring. Each of the permanent magnets of the ring has a radially inward positioned north pole and a radially outward positioned south pole. The VAT is operable to create an arc between the anode and the cathode and discharge plasma as thrust.

Additional aspects of the invention include propulsion systems for micro-satellites that include one or more of the VATs, and micro-satellites including one or more propulsion systems that include the VATs.

Other aspects of the invention, including components, parts, sub-assemblies, assemblies, kits, processes, methods, and the like which constitute part of the invention, will become more apparent upon reading the following detailed description of the exemplary embodiments.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. In such drawings:

FIGS. 1A and 1B are respectively top and rear perspective views of a spacecraft (microsatellite) in the form of a CubeSat or SmallSat equipped with a propulsion system according to an exemplary embodiment of the invention;

DETAILED DESCRIPTION OF THE EXEMPLARY EMBODIMENT(S) AND EXEMPLARY METHOD(S)

Figure 2:
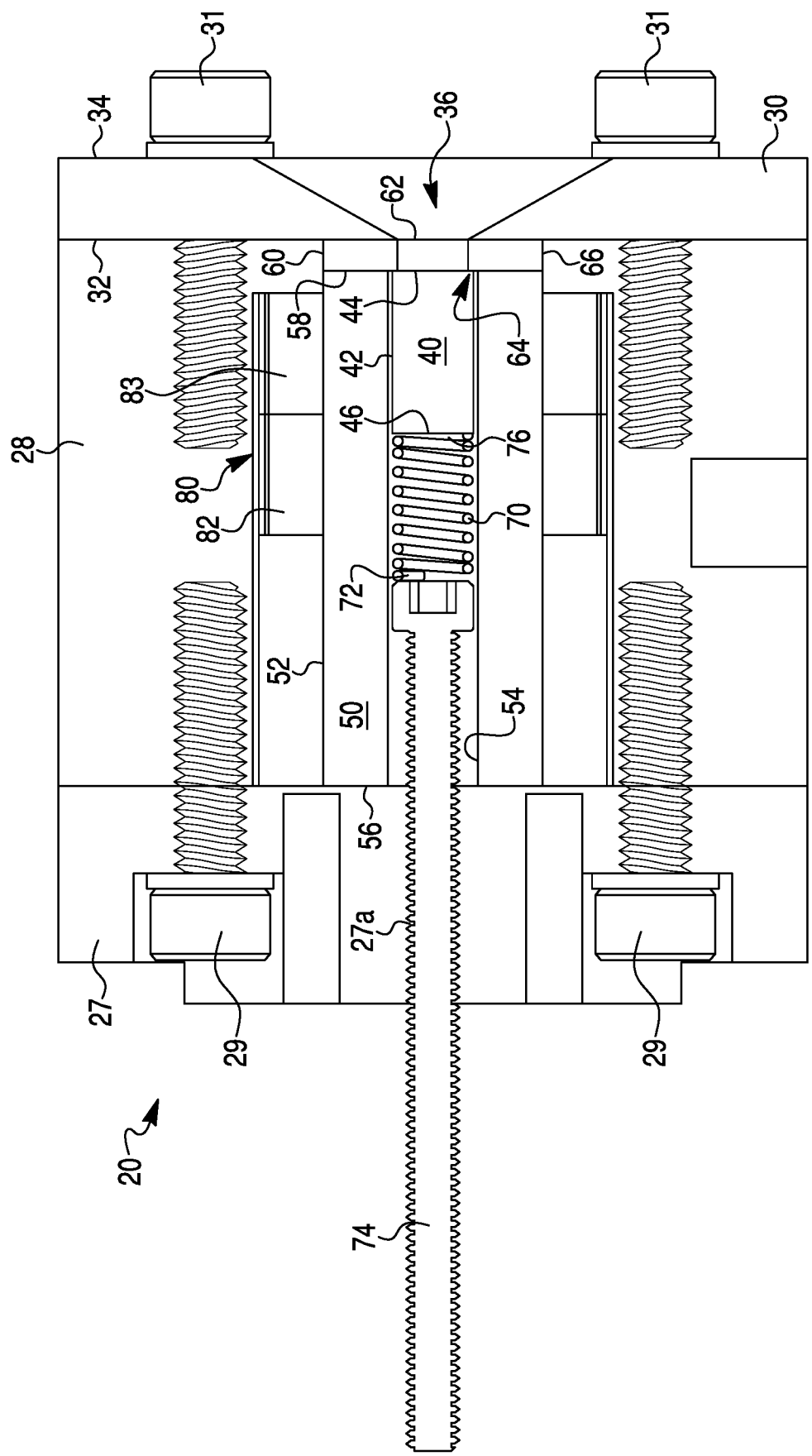
FIG. 2 is a cross-sectional side view of a vacuum arc thruster according to a first embodiment of the invention.

Reference will now be made in detail to exemplary embodiments and exemplary methods of the invention. It should be noted, however, that the invention in its broader aspects is not necessarily limited to the specific details, representative materials and methods, and illustrative examples shown and described in connection with the exemplary embodiments and exemplary methods.

A spacecraft or microsatellite embodied as a cube satellite (CubeSat) or small satellite (SmallSat) is generally designated by reference numeral 10 in FIGS. 1A and 1B. The spacecraft (microsatellite) 10 includes an external framework or lattice 12 defining six faces. Although the framework 12 is configured as a cube, it should be understood that the framework 12 may be configured to possess other shapes. The spacecraft 10 may include one or more solar panels (not shown) for powering and recharging the spacecraft power unit(s), described below. The spacecraft 10 may also contain a payload. With the exception of the thrusters and propulsion system described herein, the structure and function of spacecraft such as CubeSats and SmallSats and their payloads are known in the art.

As best shown in FIG. 1B, in the illustrated embodiment a rear face of the microsatellite (or spacecraft) 10 includes four vacuum arc thrusters (or "thrusters" for short) 20, 22, 24, and 26 spaced equidistantly from a center of the rear face of the spacecraft 10. The thrusters 20, 22, 24, and 26 are circumferentially equidistantly spaced from one another. The arrangement and spacing of the thrusters 20, 22, 24, and 26 with respect to one another allow for accurate and precise attitude and orbital control and constellation formation management. The spacecraft 10 may include fewer or more thrusters (e.g., one, two, three, four, five, six, or more thrusters) than shown. Further, the thrusters may be provided on multiple faces, including opposite faces, of the spacecraft 10.

Figure 3:
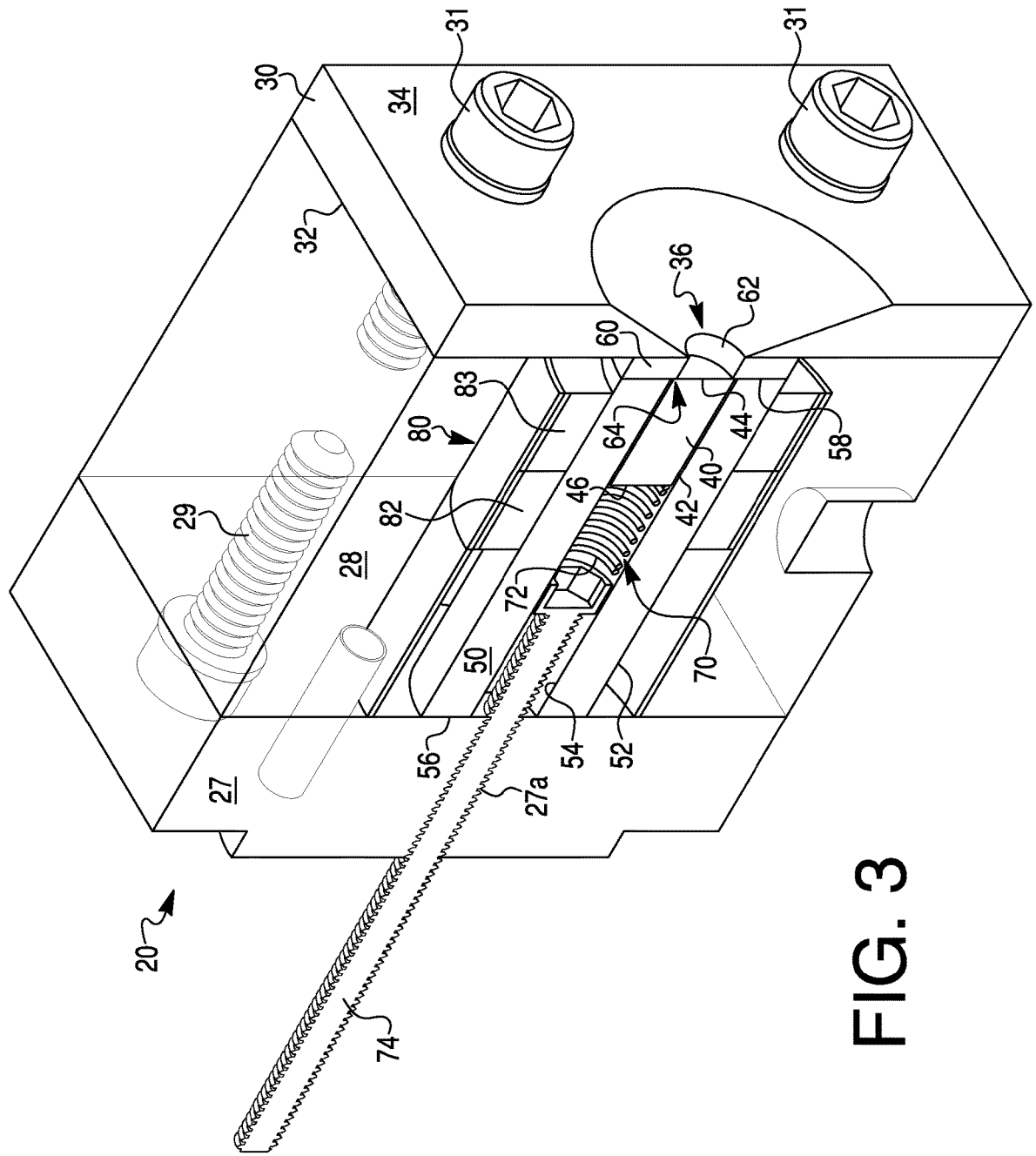
FIG. 3 is a cross-sectional perspective view of the vacuum arc thruster of FIG. 2.

The thruster 20 of a first exemplary embodiment of the invention is illustrated in greater detail in FIGS. 2 and 3. Any or all of the remaining thrusters 22, 24, and 26 may have the same structure and operation of the thruster 20. In the interest of brevity, only thruster 20 is discussed below, but it should be understood that the discussion applies to the thrusters 22, 24, and 26 as well.

Referring to FIGS. 2 and 3, the thruster 20 includes a housing formed from a forward housing component 27 and a radially outer housing component 28 connected to one another with fasteners 29, such as bolts. The housing is shown made of multiple (e.g., two, three, four, or more) components, such as components 27 and 28 in FIG. 2. Alternatively, the housing may be made of a single unitary part. Exemplary materials from which the housing components 27 and 28 may be made are non-ferromagnetic materials, such as aluminum, plastics (e.g., polytetrafluoroethylene, and polyetherimide (e.g., Ultem), polyether ether ketone (PEEK)) and like materials.

An anode 30 is connected to a rear or distal end of the radially outer housing component 28 using suitable fasteners 31, such as bolts. The anode 30 has a disc shape with a proximal end or planar surface 32 abutting against the distal end or planar surface of the radially outer housing component 28. The anode 30 also has an opposite distal end or surface 34. A central discharge nozzle 36 diverges (or is chamfered) rearwardly between the proximal end 32 and the distal end 34 of the anode 30. The nozzle 36 is centrally positioned in the anode 30 and is coaxial with the radially outer housing component 28. As shown, the anode 30 is a unitary (monolithic) piece, although it is possible to make the anode 30 of multiple pieces. The anode 30 preferably is made of a non-ferromagnetic electrically conductive material, such as copper, aluminum, tungsten, molybdenum, or carbon. Copper is particularly useful because it has low electrical resistance and is highly thermally conductive.

Figure 4:
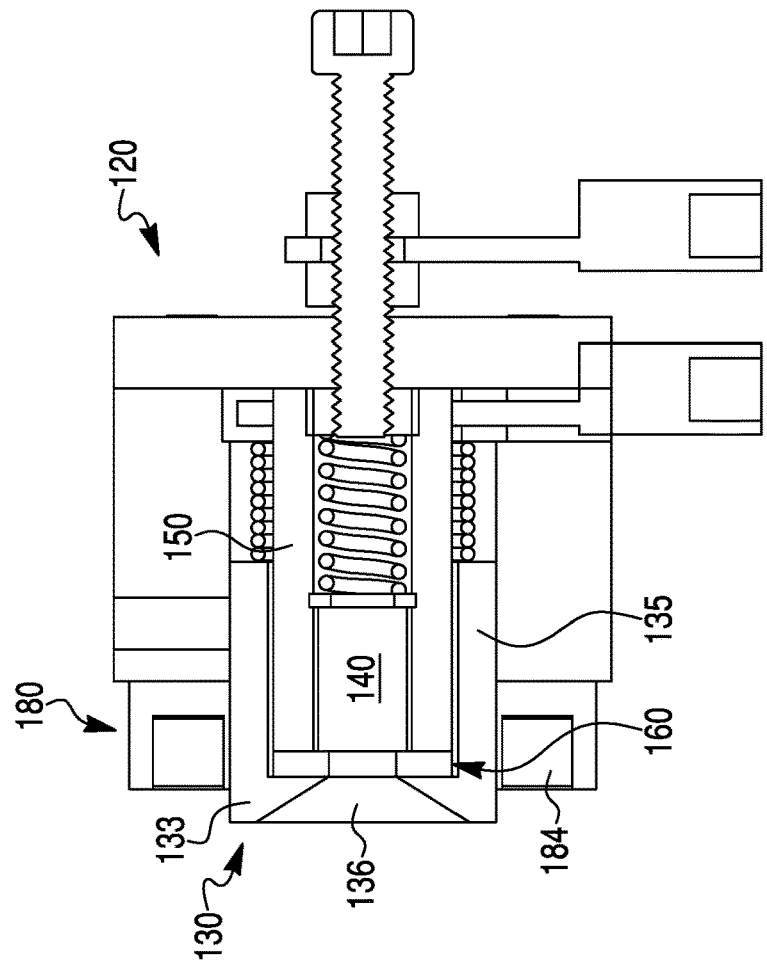
FIG. 4 is a cross-sectional side view of a vacuum arc thruster according to a second embodiment of the invention.

A benefit of incorporating the nozzle 36 into the anode 30 is space reduction. Another benefit of the design of the anode 30 embodied in FIGS. 3 and 4 is excellent heat dissipation, which decreases macroparticle ejections and reduces macroparticle and ion implanting into the thruster components.

A cathode 40 is centrally positioned and coaxial with and forward relative to the anode 30. In the illustrated embodiment, the cathode 40 is a solid rod that is not annular and does not have a hollow center portion. Rather, the cathode 40 has a solid center along its longitudinal axis. The cathode 40 has a cylindrical exterior surface 42 extending between a distal surface 44 and an opposite proximal surface 46. The distal surface 44 of the cathode 40 faces the nozzle 36 and provides a location for the cathode spots to form in response to electric arcs, as discussed further below. In a preferred embodiment, the distal surface 44 is a planar and continuous (i.e., non-annular) disc. The cathode 40 is made of a fuel (or propellant material) that is preferably non-ferromagnetic and electrically conductive. Suitable cathode fuels include nickel, tungsten, carbon, aluminum, molybdenum, magnesium, titanium, and others. Tungsten is particularly useful for increasing total fuel (propellant) per given area, thrust, and specific impulse.

An insulator tube 50 is interposed between the cylindrical exterior surface 42 of the cathode 40 and a radially interior surface (unnumbered) of the housing component 28. The insulator tube 50 has a cylindrical exterior surface 52 and a concentric cylindrical interior surface 54, both of which extend lengthwise between an annular proximal end 56 and an annular distal end 58 of the insulator tube 50. The cylindrical exterior surface 52 of the insulator tube 50 faces the radially outer housing component 28. The cylindrical interior surface 54 of the insulator tube 50 faces and surrounds the cylindrical exterior surface 42 of the cathode 40. The insulator tube 50 is greater in length than and extends forward (to the left in FIG. 2) beyond the proximal surface 46 of the cathode 40. Although the exterior and interior surfaces 52 and 54 are described and illustrated as cylindrical, it should be understood that either or both surfaces 52 and 54 may possess other cross-sectional shapes, such as polygonal (e.g., square, rectangular, pentagonal, hexagonal) or oval.

An annular insulator washer 60 is positioned between the distal end 58 of the insulator tube 50 and the proximal end 32 of the anode 30. The insulator washer 60 includes a central passage 62 coaxially aligned with the nozzle 36 of the anode 30 and a central axis of the cathode 40. The diameter of the central passage 62 is smaller than the diameter of the cylindrical exterior surface 42 of the cathode 40. As a result, an annular peripheral portion of the cathode 40 abuts against an inner annular portion (or annular stop) 64 of the insulator washer 60 to prevent the cathode 40 from passing into and through the central passage 62.

The insulator tube 50 and the insulator washer 60 may be made of the same or different non-conducting material, such as alumina, alumina silicate, mica, high temperature ceramics, etc.

At least a portion of the insulator washer 60 is coated with a thin conductive layer 66 to create a high resistance electrical path between the anode 30 to the cathode 40. The conductive layer 66 may be made of an electrically conductive material, such as conductive graphene, graphite, carbon, and metals (e.g., aluminum, copper). The conductive layer 66 may be printed using three-dimensional (3D) printing or vacuum arc deposition. The conductive layer 66 has a resistance, such as on the order of, for example, 1 ohm (Ω) to 100 kilo-ohms (kM). The resistance of the conductive layer 66 may be controlled through selection of the material and thickness of the conductive layer 66. The conductive layer 66 may have a film thickness of, for example, 0.1 micron to 1 micron.

The thruster 20 further includes a biasing member 70 having a proximal end 72 abutting against an adjusting screw 74 that threadingly engages a threaded passage 27a in the forward housing component 27. The adjusting screw 74 is coaxial with the cathode 40. The biasing member 70 has an opposite distal end 76 engaging the proximal end 46 of the cathode 40. The biasing member 70 urges the cathode 40 toward the nozzle 36 and into abutment against the annular stop 64 of the insulator washer 60. The biasing member 70 is embodied in FIGS. 2 and 3 as a compression spring, but may take other forms, such as other types of springs, a stepper motor, or other suitable elements or devices.

A magnetic field generator 80 is positioned around the cylindrical external surface 52 of the insulator tube 50, and concentrically with respect to the cathode 40. In particularly preferred embodiments, the magnetic field generator 80 includes one or more Halbach arrays. FIGS. 2 and 3 illustrate two Halbach arrays 82 and 83 configured as rings positioned axially adjacent to one another. Each of the Halbach arrays 82 and 83 includes a plurality of permanent magnets arranged in a ring. Each of the permanent magnets of the rings has a radially inward positioned north pole (optionally in contact with the external surface 52 of the insulator tube 50) and a radially outward positioned south pole (optionally in contact with the insulator component 28). Alternatively, the magnetic field generator 80 may embody other forms, such as an electromagnet or permanent magnet, or a combination of different forms (e.g., a Halbach array in combination with a permanent magnet or electromagnet arranged axially adjacent to one another).

Figure 5:
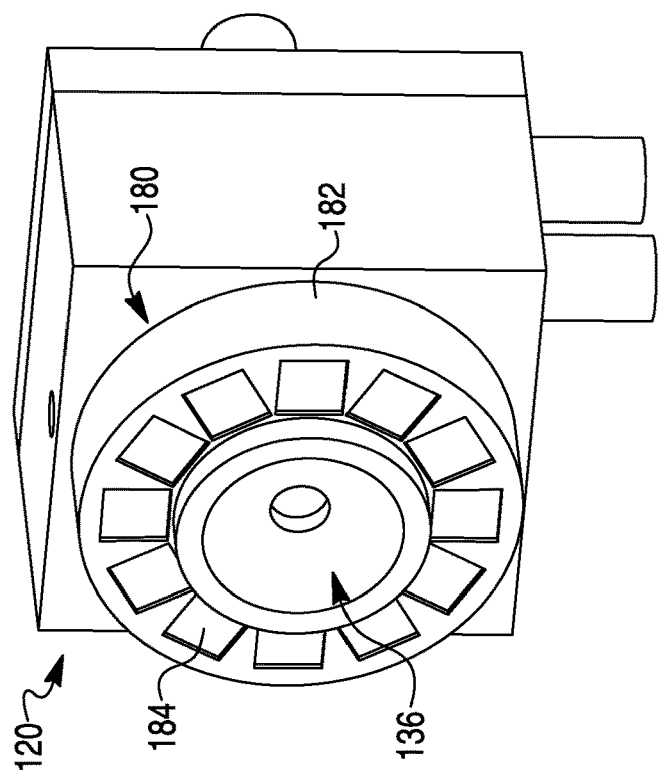
FIG. 5 is a perspective rear view of the vacuum arc thruster of FIG. 4.

FIGS. 4 and 5 illustrate a vacuum arc thruster 120 according to a second embodiment of the invention that may be used with the spacecraft 10. The description of the first embodiment is incorporated herein as applying to the second embodiment, except where differences are pointed out. Like reference numerals are used in the description of the first and second embodiments, except that the reference numerals of FIGS. 4 and 5 are in the one hundred (100) series.

The thruster 120 of FIGS. 4 and 5 includes an anode 130 and a cathode 140 coaxially aligned with one another. The anode 130 has a distal end portion 133 and a tubular body portion 135 extending forwardly (to the right in FIG. 4) of the distal end portion. The distal end portion 133 and the tubular body portion 135 may be made of a unitary (monolithic) piece, as shown, or of multiple parts. The distal end portion 133 is configured as a circular plate having a rearwardly diverging nozzle 136. The tubular portion 135 of the anode 130 extends around the cylindrical exterior surface (unnumbered) of an insulator tube 150. An insulator washer 160 separates the anode 130 and the cathode 140, and may be provided with an electrically conductive layer for forming an electric arc. The insulator washer 160 includes an annular stop similar to annular stop 64 of FIGS. 2 and 3.

The thruster 120 includes a magnetic field generator 180 embodied as a Halbach array arranged in a single ring surround the anode 130. The Halbach array 180 axially overlaps the distal end of the cathode 140 and the insulator washer 160. The Halbach array 180 is shown in greater detail in FIG. 5 as including a housing 182 and a plurality of permanent magnets 184. In the illustrated embodiment, the Halbach array includes twelve (12) permanent magnets 184 circumferentially equidistally spaced from one another in an annular arrangement. It should be understood that the Halbach array 180 may include fewer or more magnets 184 than shown. In a preferred embodiment, each of the magnets 184 has a radially inward positioned north pole and a radially outward positioned south pole.

Figure 7:
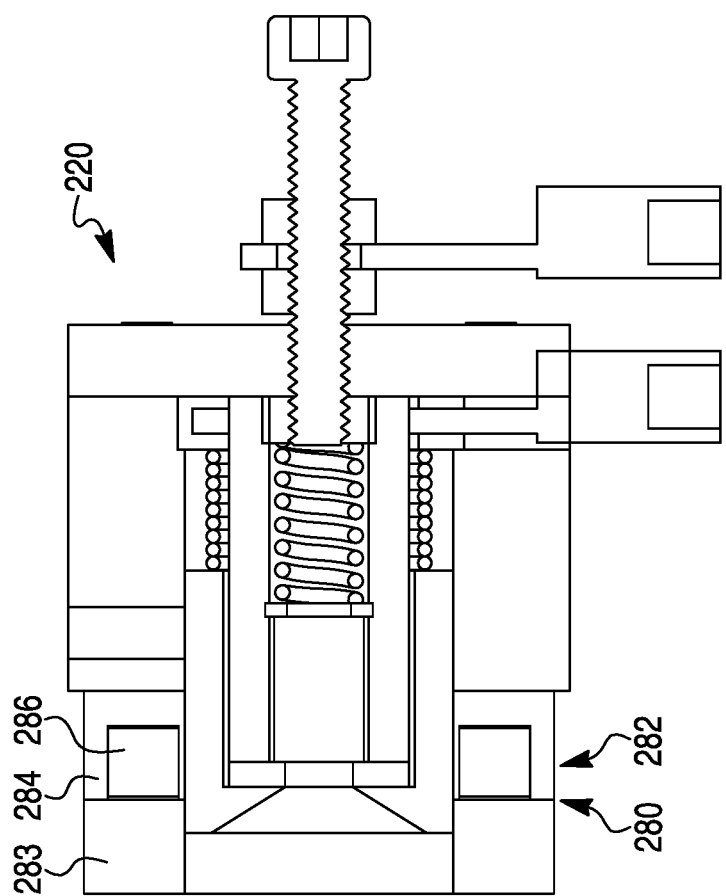
FIG. 7 is a cross-sectional side view of the vacuum arc thruster of FIG. 6.
Figure 6:
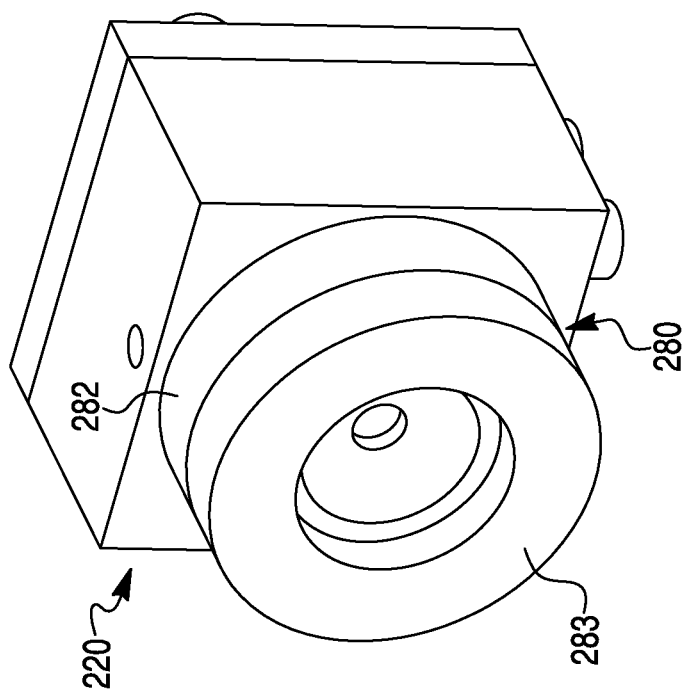
FIG. 6 is a perspective rear view of a vacuum arc thruster according to a third embodiment of the invention.

FIGS. 6 and 7 illustrate a vacuum arc thruster 220 according to a third embodiment of the invention that may be used with the spacecraft 10. The descriptions of the first and second embodiments are incorporated herein as applying to the third embodiment, except where differences are pointed out. Like reference numerals are used in the description of the first and third embodiments, except that the reference numerals of FIGS. 6 and 7 are in the two hundred (200) series.

The vacuum arc thruster 220 includes a magnetic field generator 280 having a proximal ring 282 and a distal ring 283. The proximal ring 282 is embodied as a Halbach array including a housing 284 and a plurality of permanent magnets 286. The permanent magnets 286 are in an annular arrangement. In a preferred embodiment, each of the magnets 286 has a radially inward positioned north pole and a radially outward positioned south pole. The distal ring 283 is an annular permanent magnet.

Figure 8:
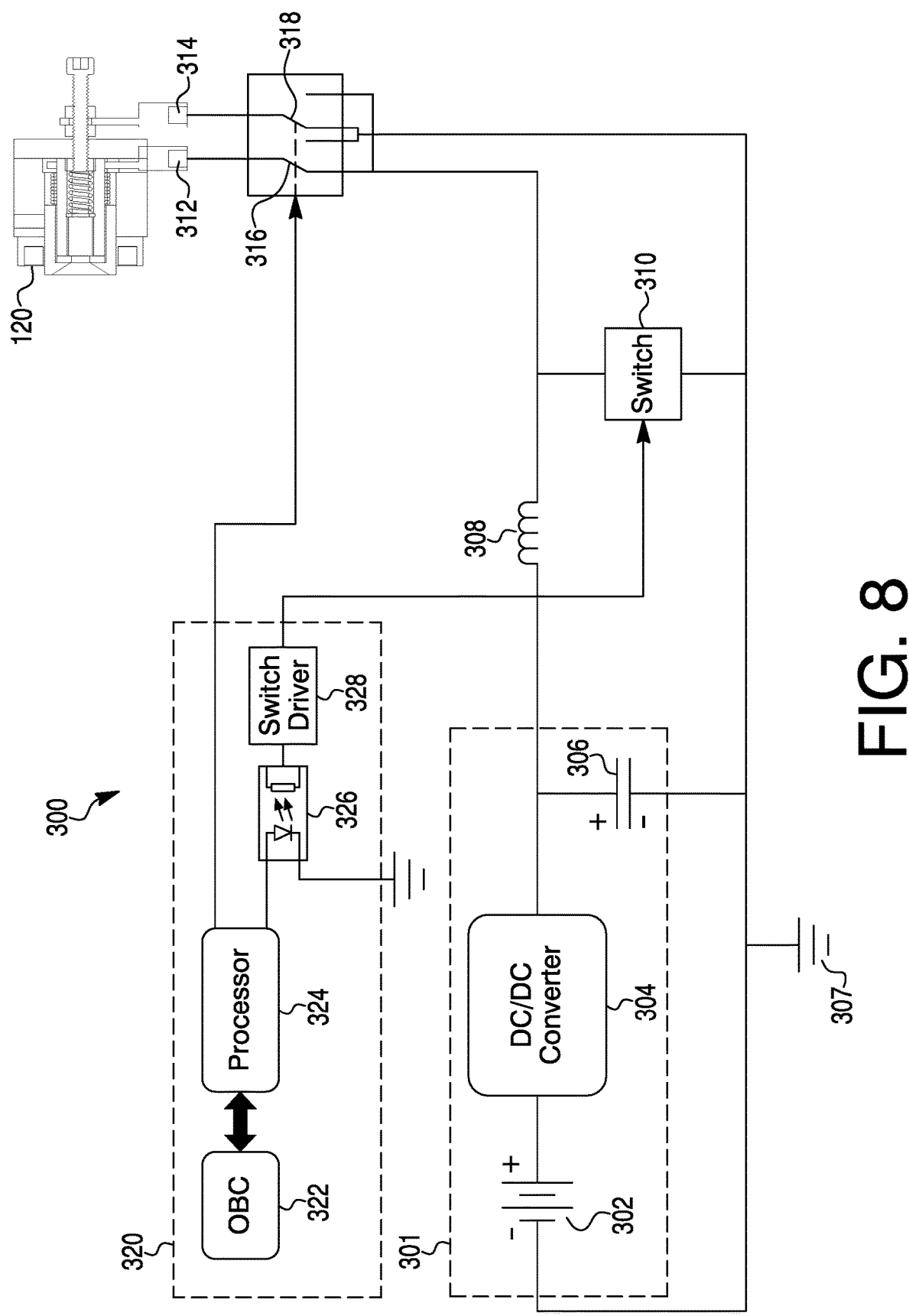
FIG. 8 is a circuit diagram of a propulsion system according to an embodiment of the invention.

FIG. 8 is a circuit diagram of a circuit 300 connected to the vacuum arc thruster 120 of FIGS. 4 and 5. It should be understood that the circuit diagram is equally compatible with the thruster 20 of FIGS. 2 and 3 and the thruster 220 of FIGS. 6 and 7.

The circuit 300 of FIG. 8 depicts a power unit 301 including a voltage source 302 (e.g., a CubeSat Power BUS), a DC/DC converter 304, and a capacitor 306. The voltage source 302 is preferably a DC voltage source, such as a battery or batteries. As mentioned above, solar panels may be provided for recharging the battery/batteries or servicing as the voltage source.

The voltage source 302 is coupled to and provides current to the DC/DC converter 304. The current provided by the voltage source 302 has a first voltage level. The DC/DC converter 304 converts the voltage of the current from the first voltage level to a second voltage level that differs from the first voltage level. For example, the first voltage level of the current leaving the voltage source 302 may be on the order of 5-10 V, while the second voltage level of the current discharged from the DC/DC converter 304 is preferably higher, such as on the order of 14-50 V.

A DC/DC converter 304 provides current having the second voltage level to a capacitor 306 and to an inductor 308 in parallel with one another. The capacitor 306 is positioned between the DC/DC converter 304 and ground 307. The inductor 308 is provided between the DC/DC converter 304 and a main switch 310. The inductor 308 may be embodied as an inductor coil or any other type of suitable inductor.

The main switch 310 may be an insulated-gate bipolar transistor (IGBT) or other suitable switching device. Operation of the main switch 310 is controlled by a controller unit 320. The controller unit 320 includes an onboard computer (OBC) 322, a processor 324, a diode 326, and a (MOSFET)

switch driver 328. The OBC 322 communicates with the processor 324 using any suitable bus or protocol (e.g., I2C, SPI, CAN, RS422).

The processor 324 initiates a trigger pulse that passes through the switch driver 328 and causes the switch 310 to close, charging the inductor 308. Fully charging the inductor 308 may take, for example, between 100 and 200 microseconds. After the inductor 308 has been charged, the processor 324 sends signals (e.g., micro-pulses) to cause the main switch 310 to open and close at high frequencies, such as on the order of a few microseconds, which generates voltage pulses (e.g., surges or spikes) L (di/dt) at the inductor 308.

The inductor 308 is electrically connected to electrode terminals 312 and 314 of the thruster 120 (or 20 or 220). The voltage surge/pulse is transferred to the thruster 120 to initiate an arc discharge between the anode and cathode at a cathode spot. The capacitor 306 serves as a supply to the inductor during the charging cycle, and reduces the charging demands on the DC/DC converter and voltage source during charging. The high power density of the voltage surge/pulse heats, vaporizes, and ejects material from the distal surface of the cathode as an ionized electrically quasi-neutral plasma stream. Each arc discharge creates a plasma exhaust, also referred to as an impulse bit. Plasma formation at the distal surface of the cathode is controlled by varying the frequency of arc discharges and pulse length via a controller unit 320. Pulse lengths may be on the order of, for example, 40 to 2000 microseconds.

While not necessarily wishing to be bound by any theory, it is believed that the voltage surge/pulse causes a voltage breakdown across the conductive layer coating the insulator washer. The breakdown creates micro-gaps in the conductive layer. The initial micro-plasma sites assist in the initiation of a main plasma discharge. The micro-plasmas expand into the surrounding space and allow current to flow directly between the cathode and the anode along a plasma discharge path having a lower resistance than the conductive layer. The ions released from the cathode expand in a vacuum and, guided by the Halbach array, travel at velocities between, for example, 10-20 km/s. Most of the ions expand outward in a vacuum but some are returned to the surface of the cathode. The returning ions help to continue heating the cathode spot until the arc is unstable and a new arc forms in a new spot on the cathode surface. The returning ions also reform the conductive layer.

As the cathode is consumed at its distal end, the biasing member (e.g., 70) slides the cathode rearward (to the right in FIG. 2 and to the left in FIGS. 4 and 7) to maintain contact with the insulator washer, and in particular the radially interior stop portion of the insulator washer. This sliding movement continues until the plasma formation depletes the cathode material. In this manner, the thruster is a limited-life part, where its life is dependent on total cathode material and efficiency of plasma emission as a function arc discharge.

The center-cathode design provides several benefits over an annular-cathode (anode-center) design. Ion beam collimation and thrust are increased. The center-cathode design also reduces or eliminates off-center thrust vectoring, preventing reset of electronic boards from ion backflux.

Figure 10:
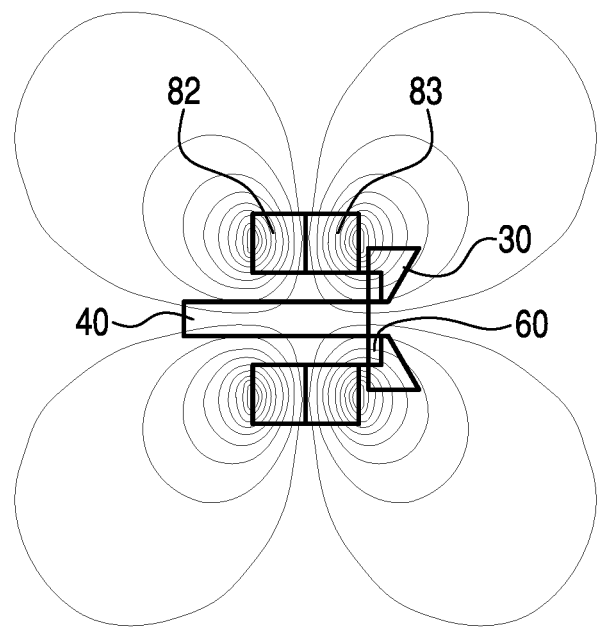
FIG. 10 is a magnetic field diagram of a dual Halbach array.
Figure 11:
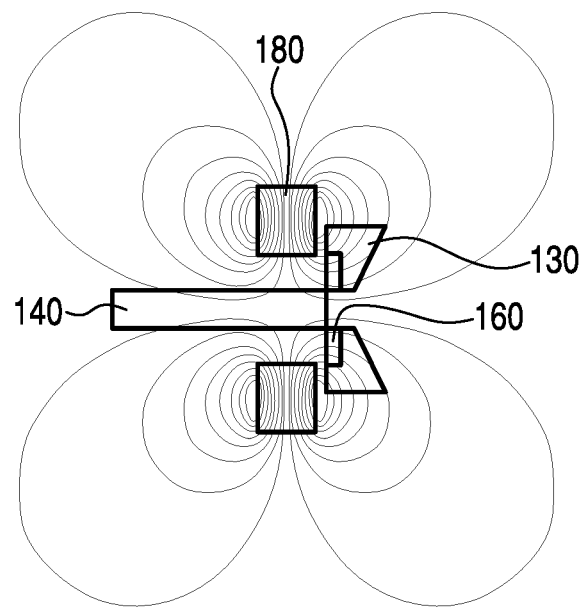
FIG. 11 is a magnetic field diagram of a single Halbach array.

The Halbach array(s) of magnetic field generator 180 (or 80 or 280) generates a magnetic field that collimates the plasma into a collimated jet (or plume), which is discharged through the nozzle (e.g., 36, 136) to produce thrust. A magnetic field of the dual Halbach array 80 of the first exemplary embodiment of the invention is shown in FIG. 10. A magnetic field of the single Halbach array 180 of the second exemplary embodiment is shown in FIG. 11. The magnetic fields generated by the Halbach arrays redirect ions traveling in a non-axial (e.g., radial) direction to travel in an axial collimated flow.

There are several benefits to using a Halbach array over conventional permanent magnets and electromagnets. The annularly arranged permanent magnets of the Halbach array do not require a power source (unlike an electromagnet) and thus the operation of the Halbach array does not disrupt the creation of the vacuum arc. Further, the magnetic field of the Halbach array has adequate strength, is constant, and does not depend upon the vacuum arc current. The Halbach array increases cathode spot movement to prevent or reduce macroparticles, which can result from prolonged localized heating. According to an exemplary embodiment, the permanent magnets of the Halbach array have their north poles directed radially inward towards one another to provide greater collimation and magnetic acceleration of the plasma plume compared to conventional axial permanent magnet rings, thereby increasing the exhaust velocity and thrust correction factor CT. In contrast, an axial permanent magnet ring can trap or cause divergence of the plasma plume because the plasma is created in or travels into a diverging field. The Halbach array magnetic field does not diverge as much and, as shown in FIGS. 10 and 11, the magnetic field lines perpendicularly cross the cathode face. The Halbach array magnetic field is symmetrical, which in theory provides less (and possibly no) magnetic torque to the spacecraft produced by interaction between the permanent magnets and the Earth's magnetic field. Finally, by arranging the magnets with their north poles pointing radially inwardly, the magnet array cancels out most field lines running exterior to the array, reducing the flux interference to other sections of the spacecraft, e.g., to onboard instruments and guidance, navigation, and control (GNC) equipment.

While FIG. 8 shows the power unit 301 and the controller unit 320 connected to a single thruster (i.e., thruster 120), the power unit 301 and the controller unit 320 may send signals to two, three, more, or all of the thrusters with different frequencies in a range of, for example, 1 to 25 Hz. A plurality of separate command lines (one for each thruster) transfer the signals to the power unit 301, which transfers control signals to the thrusters and provides the required energy to fire the thrusters.

FIG. 8 also shows the controller unit 320 optionally connected to secondary switches 316 and 318 to impart reversibility to the electrodes of the thruster 120 (or 20 or 220). That is, the controller unit 320 can control the secondary switches 316 and 318 to cause either of the electrodes to function as the cathode and the other electrode to function as the anode. This reversibility is primarily used to remove macroparticles that may form during plasma generation.

Figure 9:
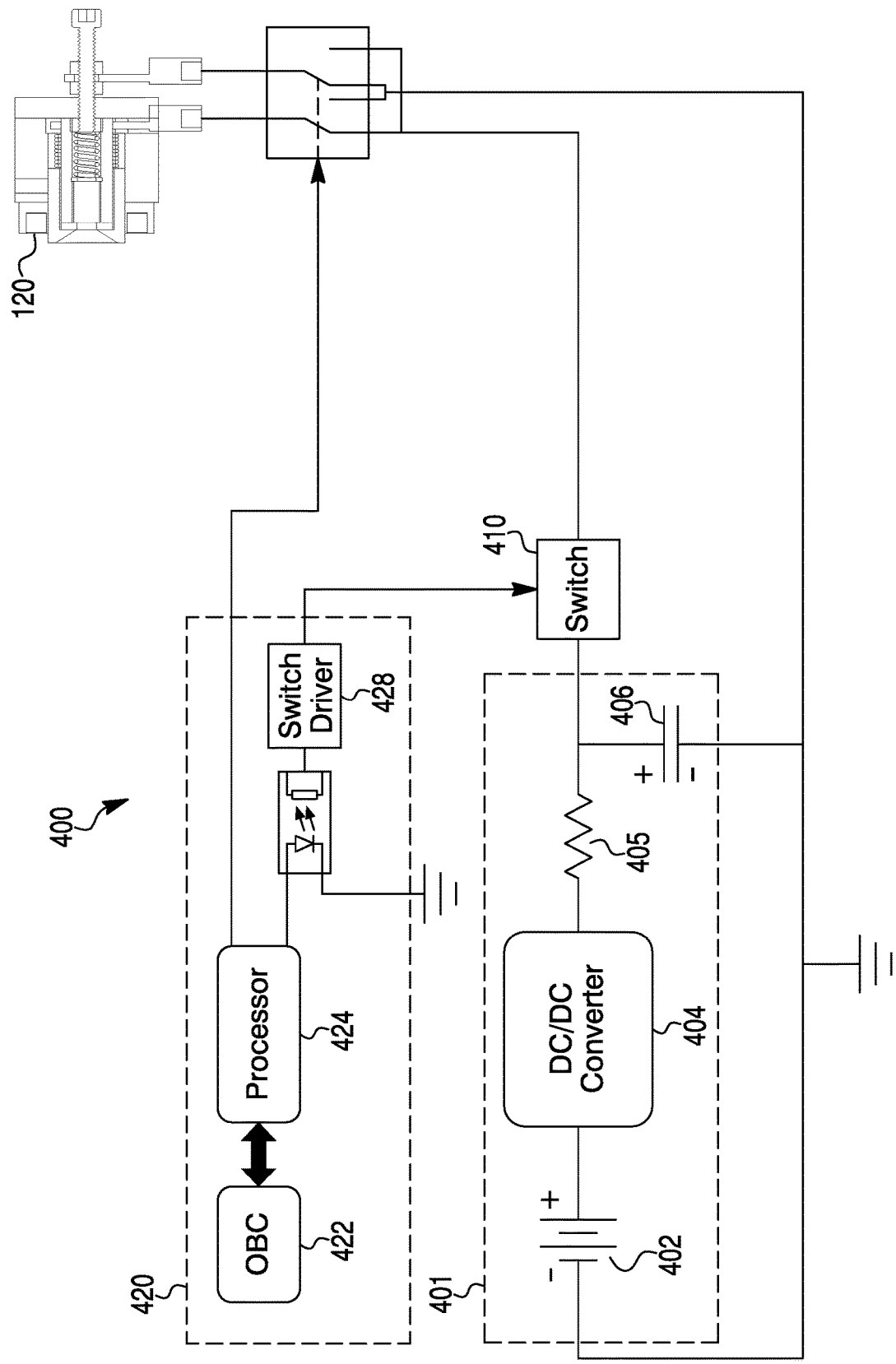
FIG. 9 is a circuit diagram of a propulsion system according to another embodiment of the invention.

FIG. 9 illustrates an alternative circuit 400 in place of circuit 300 that may be used with the spacecraft 10. The description of the circuit 300 is incorporated herein as applying to the circuit 400, except where differences are pointed out. Like reference numerals are used in the description of the circuits 300 and 400, except that the three hundred (300) series of FIG. 9 is replaced by four hundred (400) series reference numerals in describing the circuit 400 of FIG. 9. The power unit 401 includes a power source 402, a DC/DC converter 404, a resistor 405, and a capacitor 406. The control unit 420 includes an onboard computer 422, a processor 424, a diode 426, and a switch driver 428. The circuit 400 is also provided with a main switch 410. The processor 424 initiates a trigger pulse that passes through the switch driver 428 to close the main switch 410. Voltage stored in the capacitor 406 is transferred to the thruster 120 (or 20 or 220) to initiate a plasma arc between the cathode and the anode. The high temperature causes the cathode to emit plasma, which is collimated by the Halbach array to cause acceleration of the thruster. The processor 424 transmits a signal to open the main switch 410 to recharge the capacitor 406.

The ion control systems of the exemplary embodiments described herein are high specific impulse (Isp), low-thrust electric micro-propulsion systems. The systems are suitable for small satellite attitude control, precision orbit control, constellation formation management, and extended low-thrust maneuvers. The systems can be implemented within constraints of typical SmallSat/CubeSat costs and schedules using off-the-self components and systems.

The various components and features of the above-described exemplary embodiments may be substituted into one another in any combination. It is within the scope of the invention to make the modifications necessary or desirable to incorporate one or more components and features of any one embodiment into any other embodiment. In addition, although the exemplary embodiments discuss steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, supplemented, and/or adapted in various ways.

The foregoing detailed description of the certain exemplary embodiments has been provided for the purpose of explaining the principles of the invention and its practical application, thereby enabling others skilled in the art to understand the invention for various embodiments and with various modifications as are suited to the particular use contemplated. This description is not necessarily intended to be exhaustive or to necessarily limit the invention to the precise embodiments disclosed.

What is claimed is:

1. A vacuum arc thruster for a propulsion system of a micro-satellite, comprising:
    a unitary anode defining a diverging nozzle:
    a consumable solid rod cathode made of a non-ferromagnetic and electrically conductive fuel being centrally located relative to the unitary anode and has a continuous solid distal surface;
    permanent magnets comprising an entire Halbach array, wherein all of the permanent magnets are arranged in a ring, and wherein each permanent magnet of the permanent magnets has a radially inward positioned north pole and a radially outward positioned south pole, wherein the Halbach array is constructed and arranged to generate a magnetic field that directs a plasma as a collimated plume in an axial direction through the diverging nozzle,
    an insulator disposed between the unitary anode and the consumable solid rod cathode, and
    a biasing member urging said consumable solid rod cathode towards said diverging nozzle;
    wherein the vacuum arc thruster is operable to create an arc between the unitary anode and the consumable solid rod cathode and discharge the plasma through the diverging nozzle as thrust.

2. The vacuum arc thruster of claim 1, wherein the unitary anode is entirely positioned rearward of the consumable solid rod cathode.

3. The vacuum arc thruster of claim 1, wherein the unitary anode comprises a distal end portion and a tubular body portion, the tubular body portion surrounding the consumable solid rod cathode.

4. The vacuum arc thruster of claim 1, wherein the unitary anode comprises copper.

5. The vacuum arc thruster of claim 1, wherein the insulator comprises a conductive layer electrically connecting the unitary anode and the consumable solid rod cathode.

6. The vacuum arc thruster of claim 5, wherein the conductive layer comprises a printed film.

7. The vacuum arc thruster of claim 1, further comprising an annular permanent magnet adjacent to the Halbach array.

8. The vacuum arc thruster of claim 1, wherein said insulator includes an annular stop and said biasing member includes a spring urging the consumable solid rod cathode into abutment against the annular stop such that as the consumable solid rod cathode is consumed at a distal end of the consumable solid rod cathode, wherein the consumable solid rod cathode slides rearward to maintain contact with the annular stop of the insulator.

\* \* \* \* \*